US011978468B2

(12) United States Patent
Robben et al.

(10) Patent No.: US 11,978,468 B2
(45) Date of Patent: May 7, 2024

(54) AUDIO SIGNAL PROCESSING METHOD AND SYSTEM FOR NOISE MITIGATION OF A VOICE SIGNAL MEASURED BY A BONE CONDUCTION SENSOR, A FEEDBACK SENSOR AND A FEEDFORWARD SENSOR

(71) Applicant: Analog Devices International Unlimited Company, Limerick (IE)

(72) Inventors: Stijn Robben, Boutersen (BE); Abdel Yussef Hussenbocus, Heverlee (BE); Jean-Marc Luneau, Brussels (BE)

(73) Assignee: Analog Devices International Unlimited Company, Limerick (IE)

( * ) Notice: Subject to any disclaimer, the term of this patent is extended or adjusted under 35 U.S.C. 154(b) by 286 days.

(21) Appl. No.: 17/714,616

(22) Filed: Apr. 6, 2022

(65) Prior Publication Data

US 2023/0326474 A1 Oct. 12, 2023

(51) Int. Cl.
*G10L 21/0232* (2013.01)
*G10K 11/178* (2006.01)
(Continued)

(52) U.S. Cl.
CPC ........ *G10L 21/0232* (2013.01); *G10K 11/178* (2013.01); *G10L 25/18* (2013.01);
(Continued)

(58) Field of Classification Search
CPC ................. G10L 21/0232; G10L 25/18; G10L 2021/02082; G10L 2021/02166; H04R 1/406; H04R 3/005; G10K 11/178
See application file for complete search history.

(56) References Cited

U.S. PATENT DOCUMENTS 8,751,224 B2 * 6/2014 Herve ................. G10L 21/0364 704/226
10,645,479 B1 * 5/2020 Valenzuela .......... H04B 1/0475
(Continued)

FOREIGN PATENT DOCUMENTS

CN 110856072 2/2020
WO 2016148955 9/2016
(Continued)

OTHER PUBLICATIONS

"International Application Serial No. PCT/EP2023/059152, International Search Report mailed Jun. 2, 2023", 4 pgs.
(Continued)

*Primary Examiner* — Brian L Albertalli
(74) *Attorney, Agent, or Firm* — Schwegman Lundberg & Woessner, P.A.

(57) ABSTRACT

An audio signal processing method includes measuring a voice signal, wherein the measurement performed by an audio system including first through third sensors. Measuring the voice signal produces first through third audio signals by the first through third sensors, respectively. The audio signal processing method further includes: producing an output signal by using the first audio signal, the second audio signal and the third audio signal, wherein the output signal corresponds to: the first audio signal below a first crossing frequency, the second audio signal between the first crossing frequency and a second crossing frequency, the third audio signal above the second crossing frequency. The first crossing frequency is lower than or equal to the second crossing frequency, wherein the first crossing frequency and the second crossing frequency are different for at least some operating conditions of the audio system.

20 Claims, 5 Drawing Sheets

(51) Int. Cl.

| | |
|---|---|
| ***G10L 21/0208*** | (2013.01) |
| ***G10L 21/0216*** | (2013.01) |
| ***G10L 25/18*** | (2013.01) |
| ***H04R 1/40*** | (2006.01) |
| ***H04R 3/00*** | (2006.01) |

(52) U.S. Cl.
CPC ............. *H04R 1/406* (2013.01); *H04R 3/005* (2013.01); *G10L 2021/02082* (2013.01); *G10L 2021/02166* (2013.01)

(56) References Cited

U.S. PATENT DOCUMENTS

| | | | | |
|---|---|---|---|---|
| 10,972,844 | B1 * | 4/2021 | Chiang | H04R 25/609 |
| 11,259,119 | B1 * | 2/2022 | Kim | H04R 3/04 |
| 11,259,127 | B2 * | 2/2022 | De Haan | H04R 25/405 |
| 2014/0185819 | A1 * | 7/2014 | Gleissner | H04R 1/1083 381/71.6 |
| 2017/0148428 | A1 * | 5/2017 | Thuy | H04R 1/1083 |
| 2018/0047381 | A1 * | 2/2018 | Gauger, Jr. | H04R 3/005 |
| 2018/0255405 | A1 * | 9/2018 | Rosenkranz | H04R 25/505 |
| 2019/0214038 | A1 * | 7/2019 | Bouserhal | G10L 25/84 |
| 2020/0184996 | A1 * | 6/2020 | Steele | H04R 5/00 |
| 2021/0297789 | A1 | 9/2021 | De Haan et al. | |
| 2022/0150627 | A1 * | 5/2022 | Zhou | G10L 21/0208 |
| 2022/0189497 | A1 * | 6/2022 | Rui | G10L 21/0232 |

FOREIGN PATENT DOCUMENTS

| | | |
|---|---|---|
| WO | 2021046796 | 3/2021 |
| WO | 2023194541 | 10/2023 |

OTHER PUBLICATIONS

"International Application Serial No. PCT/EP2023/059152, Written Opinion mailed Jun. 2, 2023", 6 pgs.

* cited by examiner

AUDIO SIGNAL PROCESSING METHOD AND SYSTEM FOR NOISE MITIGATION OF A VOICE SIGNAL MEASURED BY A BONE CONDUCTION SENSOR, A FEEDBACK SENSOR AND A FEEDFORWARD SENSOR

BACKGROUND OF THE INVENTION

Field of the Invention

The present disclosure relates to audio signal processing and relates more specifically to a method and computing system for noise mitigation of a voice signal measured by an audio system comprising a plurality of audio sensors.

The present disclosure finds an advantageous application, although in no way limiting, in wearable audio systems such as earbuds or earphones used as a microphone during a voice call established using a mobile phone.

Description of the Related Art

To improve picking up a user's voice signal in noisy environments, wearable audio systems like earbuds or earphones are typically equipped with different types of audio sensors such as microphones and/or accelerometers. These audio sensors are usually positioned such that at least one audio sensor picks up mainly air-conducted voice (air conduction sensor) and such that at least another audio sensor picks up mainly bone-conducted voice (bone conduction sensor).

Compared to air conduction sensors, bone conduction sensors pick up the user's voice signal with less ambient noise but with a limited spectral bandwidth (mainly low frequencies), such that the bone-conducted signal can be used to enhance the air-conducted signal and vice versa.

In many existing solutions which use both an air conduction sensor and a bone conduction sensor, the air-conducted signal and the bone-conducted signal are not mixed together, i.e. the audio signals of respectively the air conduction sensor and the bone conduction sensor are not used simultaneously in the output signal. For instance, the bone-conducted signal is used for robust voice activity detection only or for extracting metrics that assist the denoising of the air-conducted signal. Using only the air-conducted signal in the output signal has the drawback that the output signal will generally contain more ambient noise, thereby e.g. increasing conversation effort in a noisy or windy environment for the voice call use case. Using only the bone-conducted signal in the output signal has the drawback that the voice signal will generally be strongly low-pass filtered in the output signal, causing the user's voice to sound muffled thereby reducing intelligibility and increasing conversation effort.

Some existing solutions propose mixing the bone-conducted signal and the air-conducted signal using a static (non-adaptive) mixing scheme, meaning the mixing of both audio signals is independent of the user's environment (i.e. the same in clean and noisy environment conditions), or using an adaptive mixing scheme. Such mixing schemes can indeed improve noise mitigation, and there is a need to further improve noise mitigation by mixing audio signals measured by a wearable audio system.

BACKGROUND OF THE INVENTION

The present disclosure aims at improving the situation. In particular, the present disclosure aims at overcoming at least some of the limitations of the prior art discussed above, by proposing a solution for mixing audio signals produced by at least three different audio sensors of an audio system.

For this purpose, and according to a first aspect, the present disclosure relates to an audio signal processing method comprising measuring a voice signal emitted by a user, wherein:

- said measuring of the voice signal is performed by an audio system comprising at least three sensors which include a first sensor, a second sensor and a third sensor,
- the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head,
- measuring the voice signal produces a first audio signal by the first sensor, a second audio signal by the second sensor, and a third audio signal by the third sensor, The audio signal processing method further comprises producing an output signal by using the first audio signal, the second audio signal and the third audio signal, wherein the output signal is obtained by using:

- the first audio signal below a first crossing frequency,
- the second audio signal between the first crossing frequency and a second crossing frequency,
- the third audio signal above the second crossing frequency, wherein the first crossing frequency is lower than or equal to the second crossing frequency, the first crossing frequency and the second crossing frequency being different for at least some operating conditions of the audio system.

Hence, the present disclosure relies on the combination of at least three different audio signals representing the same voice signal:

- a first audio signal acquired by a first sensor which corresponds to a bone conduction sensor,
- a second audio signal acquired by a second sensor which corresponds to an air conduction sensor which measures voice signals which propagate internally to the user's head, and more specifically internally to an ear canal of the user,
- a third audio signal acquired by a third sensor which corresponds to an air conduction sensor which measures voice signals which propagate externally to the user's head.

As discussed above, the first sensor (bone conduction sensor) usually picks up the user's voice signal with less ambient noise but with a limited spectral bandwidth (mainly low frequencies) with respect to air conduction sensors. Since the second sensor (air conduction sensor) is arranged to measure voice signals which propagate internally to the user's head (inside an ear canal of the user), said second sensor typically picks up a mix of air and bone-conducted signals. Hence, such a second sensor typically has a limited spectral bandwidth with respect to the third sensor (air conduction sensor which picks up mainly air-conducted signals), although larger than the spectral bandwidth of the first sensor (bone conduction sensor). In turn, the second sensor typically picks up more ambient noise than the first sensor, but less than the third sensor. Hence, in some cases at least, each of these three audio signals can be used to mitigate noise in respective frequency bands:

the first audio signal might be useful in a lower frequency band (where it contains less ambient noise than the second audio signal and the third audio signal), the second audio signal might be useful in a middle frequency band (where it contains less ambient noise than the third audio signal and in which the first audio signal suffers from the limited spectral bandwidth of the first sensor), the third audio signal might be useful in a higher frequency band (in which the first audio signal and the second audio signal suffer from the limited spectral bandwidths of the first and second sensors).

Hence, the present disclosure uses a first crossing frequency and a second crossing frequency to define the frequency bands on which the audio signals shall mainly contribute. Basically, the first crossing frequency corresponds substantially to the frequency separating the lower frequency band and the middle frequency band, while the second crossing frequency corresponds substantially to the frequency separating the middle frequency band and the higher frequency band.

In some embodiments, the first crossing frequency and the second crossing frequency are static and remain the same regardless the operating conditions of the audio system. In such a case, the first crossing frequency and the second crossing frequency are different regardless the operating conditions of the audio system, and all three audio signals are used in the output signal.

In other embodiments, the first crossing frequency and/or the second crossing frequency are adaptively adjusted to the operating conditions of the audio system. In such a case, while all three audio signals are used in the output signal for at least some operating conditions of the audio system, there might be some operating conditions in which fewer than three audio signals are present in the output signal. For instance, while the third audio signal is in principle always used in the output signal, there might be operating conditions in which the first audio signal is not used (e.g. by setting the first crossing frequency to zero hertz) and/or the second audio signal is not used (e.g. by setting the second crossing frequency equal to the first crossing frequency).

Hence, the present disclosure improves noise mitigation of a voice signal by combining audio signals from at least three audio sensors, which typically bring improvements in terms of noise mitigation on different respective frequency bands of the audio spectrum.

In specific embodiments, the audio signal processing method may further comprise one or more of the following optional features, considered either alone or in any technically possible combination.

In specific embodiments, the audio signal processing method further comprises adapting the first crossing frequency and/or the second crossing frequency based on the operating conditions of the audio system.

In specific embodiments, the operating conditions are defined by at least one among:

an operating mode of an active noise cancellation unit of the audio system, noise conditions of the audio system, a level of an echo signal in the second audio signal caused by a speaker unit of the audio system, referred to as echo level.

In specific embodiments, the audio signal processing method further comprises reducing a gap between the second crossing frequency and the first crossing frequency when the active noise cancellation unit is enabled compared to when the active noise cancellation unit is disabled.

Indeed, the quality of the second audio signal from the second sensor may vary depending on the operating mode of the ANC unit of the audio system. The ANC unit is a processing circuit, often in dedicated hardware, that is designed to cancel (or passthrough) ambient sounds in the ear canal. The ANC unit can be disabled (OFF operating mode) or enabled. When enabled, the ANC unit may for instance be in noise-cancelling (NC) operating mode or in hear-through (HT) operating mode. Typical ANC units rely on a feedforward part (using the third sensor) and/or a feedback part (using the second sensor). In the NC operating mode, the feedback part strongly attenuates the lowest frequencies, e.g. up to 600 hertz. In the HT operating mode, the feedback part also attenuates the lowest frequencies as in the NC operating mode, but additionally the feedforward part is configured to leak sound through from the third sensor to a speaker unit of the audio system (e.g. earbud), to give the user's the impression that the audio system is transparent to sound, thereby leaking more ambient noise to the ear canal and to the second sensor. Hence, when the ANC unit is enabled (either in NC or HT operating mode), the second audio signal from the second sensor may be difficult to use for mitigating noise in the voice signal. Hence, reducing the gap between the second crossing frequency and the first crossing frequency (and possibly setting the gap to zero) when the ANC unit is enabled reduces (and possibly cancels) the contribution of the second audio signal in the output signal.

In specific embodiments, the audio signal processing method further comprises:

estimating the echo level, reducing a gap between the second crossing frequency and the first crossing frequency when the estimated echo level is high compared to when the estimated echo level is low.

Indeed, the second sensor has another limitation compared to the first sensor (bone conduction sensor). For instance, an audio system such as an earbud typically comprises a speaker unit for outputting a signal for the user. The second sensor picks up much more of this signal from the speaker unit (known as "echo") than the first sensor because, by design, this second sensor is arranged very close to the audio system's speaker unit, in the user's ear canal. Typically, an acoustic echo cancellation, AEC, unit uses the signal output by the speaker unit to remove this echo from the second sensor's audio signal, but it may leave a residual echo or introduce distortion. Therefore, the second audio signal from the second sensor should not be used during moments of strong echo. Hence, reducing the gap between the second crossing frequency and the first crossing frequency (and possibly setting the gap to zero) when the evaluated echo level is high reduces (and possibly cancels) the contribution of the second audio signal in the output signal.

In specific embodiments, the audio signal processing method further comprises reducing the second crossing frequency when a level of a first noise affecting the third audio signal is decreased with respect to a level of a second noise affecting the first audio signal or the second audio signal or a combination thereof.

Indeed, while the first audio signal and the second audio signal will typically be less affected by ambient noise than the third audio signal, some sources of noise will affect mostly the first and second audio signals: user's teeth tapping, user's finger scratching the earbuds, etc. When such sources of noise are present, the contribution of the first and second audio signals to the output signal should be reduced (and possibly canceled), which can be achieved by reducing the second crossing frequency (possibly to zero hertz). In turn, when the ambient noise affecting the third audio signal is important, the contribution of the first and second audio signals to the output signal should be increased, e.g. by increasing the second crossing frequency.

In specific embodiments, the audio signal processing method further comprises evaluating the noise conditions by estimating only a level of a first noise affecting the third audio signal and determining the second crossing frequency based on the estimated first noise level.

In specific embodiments, the audio signal processing method further comprises:

- combining the first audio signal with the second audio signal based on a first cutoff frequency, thereby producing an intermediate audio signal,
- determining the second crossing frequency based on the intermediate audio signal and based on the third signal,
- combining the intermediate audio signal with the third audio signal based on the second crossing frequency, wherein the first crossing frequency corresponds to a minimum frequency among the first cutoff frequency and the second crossing frequency.

In specific embodiments, determining the second crossing frequency comprises:

- processing the intermediate audio signal to produce an intermediate audio spectrum on a frequency band,
- processing the third audio signal to produce a third audio spectrum on the frequency band,
- computing an intermediate cumulated audio spectrum by cumulating intermediate audio spectrum values, computing a third cumulated audio spectrum by cumulating third audio spectrum values,
- determining the second crossing frequency by comparing the intermediate cumulated audio spectrum and the third cumulated audio spectrum.

In specific embodiments, determining the second crossing frequency comprises searching for an optimum frequency minimizing a power of a combination, based on the optimum frequency, of the intermediate audio signal with the third audio signal, wherein the second crossing frequency is determined based on the optimum frequency.

According to a second aspect, the present disclosure relates to an audio system comprising at least three sensors which include a first sensor, a second sensor and a third sensor, wherein the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head, wherein the first sensor is configured to produce a first audio signal by measuring a voice signal emitted by the user, the second sensor is configured to produce a second audio signal by measuring the voice signal and the third sensor is arranged to produce a third audio signal by measuring the voice signal. Said audio system further comprises a processing circuit configured to produce an output signal by using the first audio signal, the second audio signal and the third audio signal, wherein the output signal corresponds to:

- the first audio signal below a first crossing frequency,
- the second audio signal between the first crossing frequency and a second crossing frequency,
- the third audio signal above the second crossing frequency, wherein the first crossing frequency is lower than or equal to the second crossing frequency, wherein the first crossing frequency and the second crossing frequency are different for at least some operating conditions of the audio system.

In specific embodiments, the audio system may further comprise one or more of the following optional features, considered either alone or in any technically possible combination.

In specific embodiments, the processing circuit is further configured to adapt the first crossing frequency and/or the second crossing frequency based on the operating conditions of the audio system.

In specific embodiments, the operating conditions are defined by at least one among:

- an operating mode of an active noise cancellation unit of the audio system,
- noise conditions of the audio system,
- a level of an echo signal in the second audio signal caused by a speaker unit of the audio system, referred to as echo level.

In specific embodiments, the processing circuit is further configured to reduce a gap between the second crossing frequency and the first crossing frequency when the active noise cancellation unit is enabled compared to when the active noise cancellation unit is disabled.

In specific embodiments, the processing circuit is further configured to:

- estimate the echo level,
- reduce a gap between the second crossing frequency and the first crossing frequency when the estimated echo level is high compared to when the estimated echo level is low.

In specific embodiments, the processing circuit is further configured to reduce the second crossing frequency when a level of a first noise affecting the third audio signal is decreased with respect to a level of a second noise affecting the first audio signal or the second audio signal or a combination thereof.

In specific embodiments, the processing circuit is further configured to evaluate the noise conditions by estimating only a level of a first noise affecting the third audio signal and determining the second crossing frequency based on the estimated first noise level.

In specific embodiments, the processing circuit is further configured to:

- combine the first audio signal with the second audio signal based on a first cutoff frequency, thereby producing an intermediate audio signal,
- determine the second crossing frequency based on the intermediate audio signal and based on the third signal,
- combine the intermediate audio signal with the third audio signal based on the second crossing frequency, wherein the first crossing frequency corresponds to a minimum frequency among the first cutoff frequency and the second crossing frequency.

In specific embodiments, the processing circuit is configured to determine the second crossing frequency by:

- processing the intermediate audio signal to produce an intermediate audio spectrum on a frequency band,
- processing the third audio signal to produce a third audio spectrum on the frequency band,
- computing an intermediate cumulated audio spectrum by cumulating intermediate audio spectrum values, computing a third cumulated audio spectrum by cumulating third audio spectrum values,
- determining the second crossing frequency by comparing the intermediate cumulated audio spectrum and the third cumulated audio spectrum.

In specific embodiments, the processing circuit is configured to determine the second crossing frequency by searching for an optimum frequency minimizing a power of a combination, based on the optimum frequency, of the intermediate audio signal with the third audio signal, wherein the second crossing frequency is determined based on the optimum frequency.

According to a third aspect, the present disclosure relates to a non-transitory computer readable medium comprising computer readable code to be executed by an audio system comprising at least three sensors which include a first sensor, a second sensor and a third sensor, wherein the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head, wherein the audio system further comprises a processing circuit comprising. Said computer readable code, when executed by the audio system, causes said audio system to:

- produce, by the first sensor, a first audio signal by measuring a voice signal emitted by the user,
- produce, by the second sensor, a second audio signal by measuring the voice signal emitted by the user,
- produce, by the third sensor, a third audio signal by measuring the voice signal emitted by the user,
- produce, by the processing circuit, an output signal by using the first audio signal, the second audio signal and the third audio signal, wherein the output signal corresponds to:
  - the first audio signal below a first crossing frequency,
  - the second audio signal between the first crossing frequency and a second crossing frequency,
  - the third audio signal above the second crossing frequency, wherein the first crossing frequency is lower than or equal to the second crossing frequency, wherein the first crossing frequency and the second crossing frequency are different for at least some operating conditions of the audio system.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

As indicated above, the present disclosure relates inter alia to an audio signal processing method 20 for mitigating noise when combining audio signals from different audio sensors.

Figure 1:
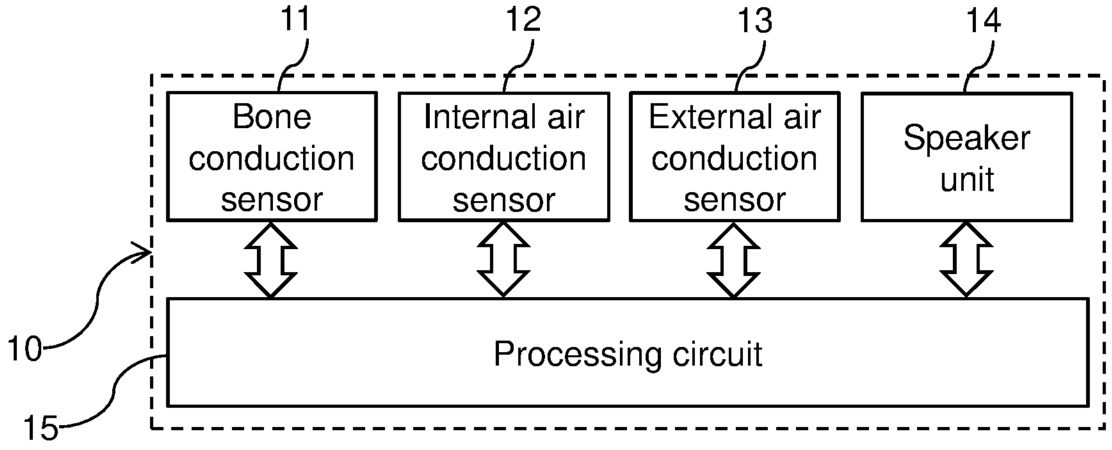
FIG. 1: a schematic representation of an exemplary embodiment of an audio system.

FIG. 1 represents schematically an exemplary embodiment of an audio system 10. In some cases, the audio system 10 is included in a device wearable by a user. In preferred embodiments, the audio system 10 is included in earbuds or in earphones.

As illustrated by FIG. 1, the audio system 10 comprises at least three audio sensors which are configured to measure voice signals emitted by the user of the audio system 10.

One of the audio sensors is a bone conduction sensor 11 which measures bone conducted voice signals. The bone conduction sensor 11 may be any type of bone conduction sensor known to the skilled person, such as e.g. an accelerometer.

Another one of the audio sensors is referred to as internal air conduction sensor 12. The internal air conduction sensor 12 is referred to as "internal" because it is arranged to measure voice signals which propagate internally to the user's head. For instance, the internal air conduction sensor 12 may be located in an ear canal of a user and arranged on the wearable device towards the interior of the user's head. The internal air conduction sensor 12 may be any type of air conduction sensor known to the skilled person, such as e.g. a microphone.

Another one of the audio sensors is referred to as external air conduction sensor 13. The external air conduction sensor 13 is referred to as "external" because it is arranged to measure voice signals which propagate externally to the user's head (via the air between the user's mouth and the external air conduction sensor 13). For instance, the external air conduction sensor 13 is located outside the ear canals of the user or located inside an ear canal of the user but arranged on the wearable device towards the exterior of the user's head, such that it measures air-conducted audio signals. The external air conduction sensor 13 may be any type of air conduction sensor known to the skilled person.

For instance, if the audio system 10 is included in a pair of earbuds (one earbud for each ear of the user), then the internal air conduction sensor 12 is for instance arranged in a portion of one of the earbuds that is to be inserted in the user's ear, while the external air conduction sensor 13 is for instance arranged in a portion of one of the earbuds that remains outside the user's ears. It should be noted that, in some cases, the audio system 10 may comprise more than three audio sensors, for instance two or more bone conduction sensors 11 (for instance one for each earbud) and/or two or more internal air conduction sensors 12 (for instance one for each earbud) and/or two or more external air conduction sensors 13 (for instance one for each earbud) which produce audio signals which can mixed together as described herein. For instance, wearable audio systems like earbuds or earphones usually comprise two or more external air conduction sensors 13. In such a case, the audio signals produced by these external air conduction sensors 13 may be combined beforehand (e.g. beamforming) to produce the third audio signal to be mixed with the audio signals produced by the bone conduction sensor(s) 11 and by the internal air conduction sensor(s) 12. Accordingly, in the present disclosure, the third audio signal may be produced by one or more external air conduction sensors 13. Similarly, the first audio signal may be produced by one or more bone conduction sensors 11 and the second audio signal may be produced by one or more internal air conduction sensors 12.

As illustrated by FIG. 1, the audio system 10 comprises also a processing circuit 15 connected to the bone conduction sensor 11, to the internal air conduction sensor 12 and to the external air conduction sensor 13. The processing circuit 15 is configured to receive and to process the audio signals produced by the bone conduction sensor 11, the internal air conduction sensor 12 and the external air conduction sensor 13 to produce a noise mitigated output signal.

In some embodiments, the processing circuit 15 comprises one or more processors and one or more memories. The one or more processors may include for instance a central processing unit (CPU), a digital signal processor (DSP), etc. The one or more memories may include any type of computer readable volatile and non-volatile memories (solid-state disk, electronic memory, etc.). The one or more memories may store a computer program product (software), in the form of a set of program-code instructions to be executed by the one or more processors in order to implement the steps of an audio signal processing method 20. Alternatively, or in combination thereof, the processing circuit 15 can comprise one or more programmable logic circuits (FPGA, PLD, etc.), and/or one or more specialized integrated circuits (ASIC), and/or a set of discrete electronic components, etc., for implementing all or part of the steps of the audio signal processing method 20.

In some embodiments, in particular when the audio system 10 is included in earbuds or in earphones, the audio system 10 can optionally comprise one or more speaker units 14, which can output audio signals as acoustic waves.

Figure 2:
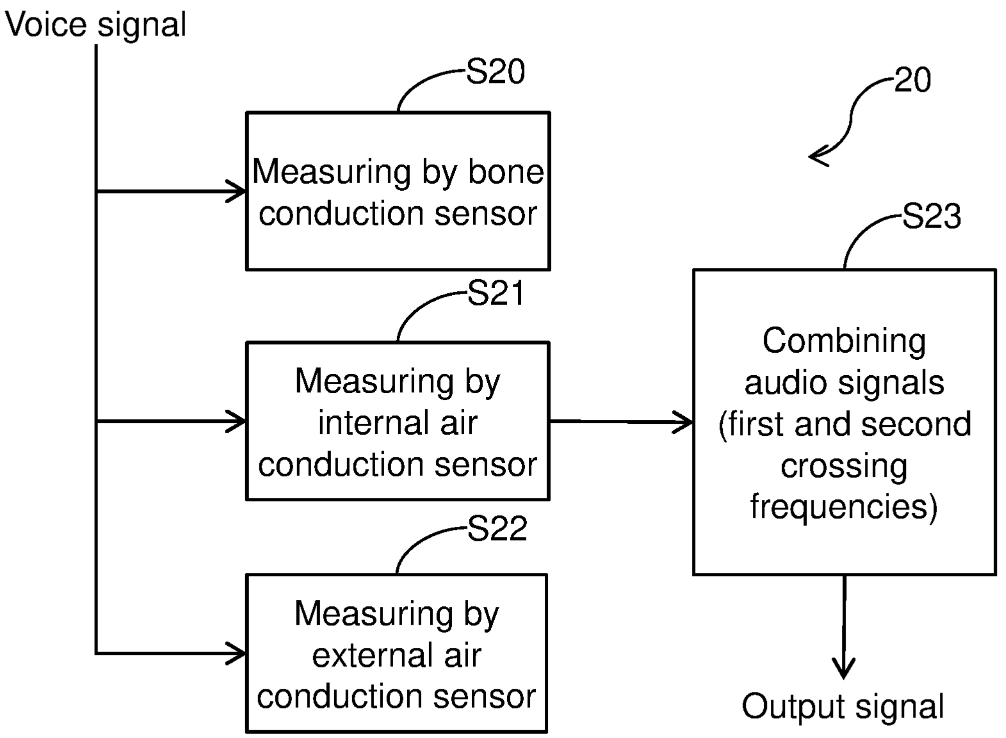
FIG. 2: a diagram representing the main steps of an exemplary embodiment of an audio signal processing method.

FIG. 2 represents schematically the main steps of an audio signal processing method 20 for generating a noise mitigated output signal, which are carried out by the audio system 10.

As illustrated by FIG. 2, the audio signal processing method 20 comprises a step S20 of measuring, by the bone conduction sensor 11, a voice signal emitted by the user, thereby producing a first audio signal. In parallel, the audio signal processing method 20 comprises a step S21 of measuring the same voice signal by the internal air conduction sensor 12 which produces a second audio signal and a step S22 of measuring the same voice signal by the external air conduction sensor 13 which produces a third audio signal.

Then, the audio signal processing method 20 comprises a step S23 of producing an output signal by using the first audio signal, the second audio signal and the third audio signal. Basically, the output signal is obtained by combining the first audio signal, the second audio signal and the third audio signal such said output signal is defined mainly by:

- the first audio signal below a first crossing frequency $f_{CR1}$,
- the second audio signal between the first crossing frequency $f_{CR1}$ and a second crossing frequency $f_{CR2}$,
- the third audio signal above the second crossing frequency $f_{CR2}$.

The first crossing frequency $f_{CR1}$ is lower than or equal to the second crossing frequency $f_{CR2}$. The first crossing frequency $f_{CR1}$ (which may be zero hertz in some cases) and the second crossing frequency $f_{CR2}$ are different for at least some operating conditions of the audio system 10. Hence, the first crossing frequency $f_{CR1}$ and the second crossing frequency $f_{CR2}$ define the frequency bands on which the audio signals shall mainly contribute, i.e.:

- a lower frequency band for the first audio signal,
- a middle frequency band for the second audio signal,
- a higher frequency band for the third audio signal.

In some embodiments, the first crossing frequency $f_{CR1}$ and the second crossing frequency $f_{CR2}$ are static and remain the same regardless the operating conditions of the audio system 10. In such a case, the first crossing frequency $f_{CR1}$ and the second crossing frequency $f_{CR2}$ are different regardless the operating conditions of the audio system 10, and all three audio signals are used in the output signal. In such a case (static first and second crossing frequencies), the first crossing frequency $f_{CR1}$ is preferably between 500 hertz and 900 hertz, for instance $f_{CR1}$=600 hertz, while the second crossing frequency $f_{CR2}$ is preferably between 1000 hertz and 1400 hertz, for instance $f_{CR2}$=1200 hertz.

In preferred embodiments, the first crossing frequency $f_{CR1}$ and/or the second crossing frequency $f_{CR2}$ are adaptively adjusted to the operating conditions of the audio system 10. In such a case, while all three audio signals are used in the output signal for at least some operating conditions of the audio system 10, there might be some operating conditions in which fewer than three audio signals are present in the output signal. For instance, while the third audio signal is in principle always used in the output signal, there might be operating conditions in which the first audio signal is not used (e.g. by setting the first crossing frequency $f_{CR1}$ to zero hertz) and/or the second audio signal is not used (e.g. by setting the second crossing frequency $f_{CR2}$ equal to the first crossing frequency $f_{CR1}$). In the sequel we consider in a non-limitative manner that the first crossing frequency $f_{CR1}$ and the second crossing frequency $f_{CR2}$ are adapted to the operating conditions of the audio system 10.

In some embodiments, it is possible to estimate the operating conditions of the audio system 10, for instance by evaluating and comparing the first audio signal, the second audio signal and the third audio signal, and to determine directly a first crossing frequency $f_{CR1}$ and a second crossing frequency $f_{CR2}$ which are adapted to the estimated operating conditions.

In other embodiments, it is possible to determine indirectly the first crossing frequency $f_{CR1}$ and/or the second crossing frequency $f_{CR2}$ based on the estimated operating conditions. For instance, the audio system 10 may comprise a first filter bank and a second filter bank. The first filter bank is configured to filter and to add together two input audio signals based on a first cutoff frequency $f_{CO1}$ and the second filter bank is configured to filter and to add together two input audio signals based on a second cutoff frequency $f_{CO2}$. Typically, at least one among the first cutoff frequency $f_{CO1}$ and the second cutoff frequency $f_{CO2}$ can be determined directly based on the estimated operating conditions, and the first crossing frequency $f_{CR1}$ and the second crossing frequency $f_{CR2}$ are defined by the first cutoff frequency $f_{CO1}$ and the second cutoff frequency $f_{CO2}$, as will be discussed hereinbelow.

For instance, the operating conditions which are considered when adjusting the first crossing frequency $f_{CR1}$ and the second crossing frequency $f_{CR2}$ are defined by at least one among, or a combination thereof:

- if the audio system 10 comprises an active noise cancellation, ANC, unit 150: an operating mode of the ANC unit 150,
- noise conditions of the audio system 10,
- a level of an echo signal in the second audio signal caused by a speaker unit of the audio system, referred to as echo level.

As discussed above, the noise environment is not necessarily the same for all audio sensors of the audio system 10, such the noise conditions may be evaluated to decide which audio signals (among the first audio signal, the second audio signal and the third audio signal) should contribute to the output signal and how. However, the third audio signal will have to be used, in general, for higher frequencies since the bone conduction sensor 11 and the internal air conduction sensor 12 have limited spectral bandwidths compared to the spectral bandwidth of the external air conduction sensor 13.

Also, the ANC unit 150 and/or the speaker unit 14, if any, will impact mainly the quality of the second audio signal, the contribution of which might need to be reduced when the ANC unit 150 is activated and/or in case of strong echo from the speaker unit 14 of the audio system 10.

Figure 3:
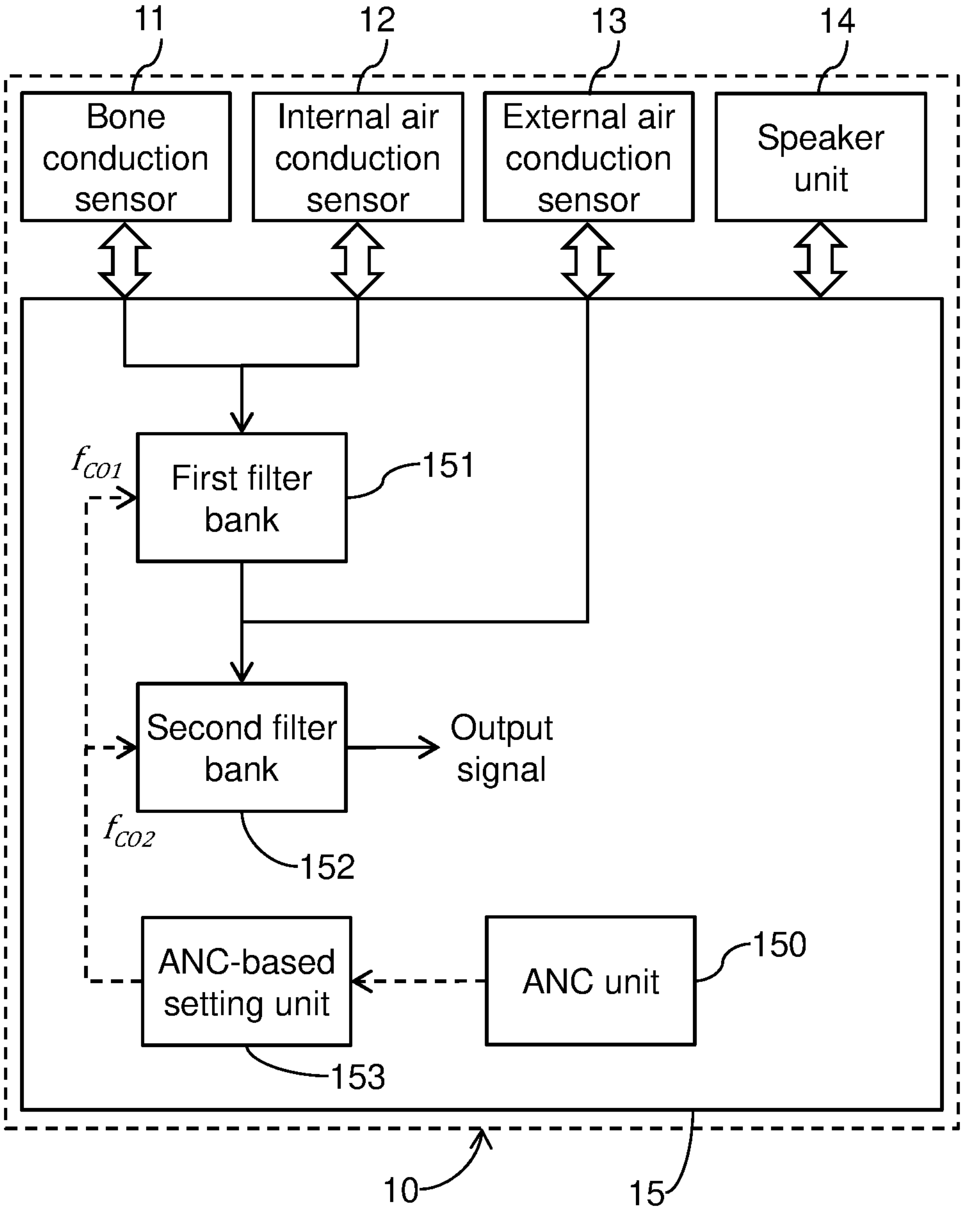
FIG. 3: a schematic representation of a first preferred embodiment of the audio system.

FIG. 3 represents schematically an exemplary embodiment of the audio system 10, in which the first crossing frequency $f_{CR1}$ and the second crossing frequency $f_{CR2}$ are adjusted based an operating mode of the ANC unit 150 of the audio system 10.

In the example illustrated by FIG. 3, the audio system 10 comprises a first filter bank 151 and a second filter bank 152, which are applied successively and are implemented by the processing circuit 15. In this example, the first filter bank 151 processes the first audio signal and the second audio signal based on a first cutoff frequency $f_{CO1}$, to produce an intermediate audio signal. The second filter bank 152 processes the intermediate signal and the third audio signal based on a second cutoff frequency $f_{CO2}$. Since the second filter bank 152 is applied after the first filter bank 151, the second crossing frequency $f_{CR2}$ is identical to the second cutoff frequency $f_{CO2}$.

Each filter bank filters and adds together its input audio signals based on its cutoff frequency. The filtering may be performed in time or frequency domain and the addition of the filtered audio signals may be performed in time domain or in frequency domain.

For instance, the first filter bank 151 produces the intermediate audio signal by:

- low-pass filtering the first audio signal based on the first cutoff frequency $f_{CO1}$ to produce a filtered first audio signal,
- high-pass filtering the second audio signal based on the first cutoff frequency $f_{CO1}$ to produce a filtered second audio signal,
- adding the filtered first audio signal and the filtered second audio signal to produce the intermediate audio signal.

Similarly, the second filter bank 152 produces the output audio signal by:

- low-pass filtering the intermediate audio signal based on the second cutoff frequency $f_{CO2}$ to produce a filtered intermediate audio signal,
- high-pass filtering the third audio signal based on the second cutoff frequency $f_{CO2}$ to produce a filtered third audio signal,
- adding the filtered intermediate audio signal and the filtered third audio signal to produce the output audio signal.

Generally speaking, a gap between the second crossing frequency $f_{CR2}$ and the first crossing frequency $f_{CR1}$ should be reduced when the ANC unit 150 is enabled compared to when the ANC unit 150 is disabled. In the example illustrated by FIG. 3, this is achieved by adjusting the respective values of the first cutoff frequency $f_{CO1}$ and of the second cutoff frequency $f_{CO2}$. For that purpose, the audio system 10 comprises an ANC-based setting unit 153, implemented by the processing circuit 15, configured to determining the operating mode of the ANC unit 150 and to adjust the cutoff frequency $f_{CO1}$ and/or of the second cutoff frequency $f_{CO2}$.

For instance, if the ANC unit 150 is disabled (OFF operating mode), then the ANC-based setting unit 153 may set the first cutoff frequency $f_{CO1}$ to a fixed predetermined frequency, for instance $f_{CO1}$=600 hertz. The second cutoff frequency $f_{CO2}$ may also be set to a fixed predetermined frequency, for instance $f_{CO2}$=1500 hertz.

Responsive to the ANC unit 150 being enabled, the contribution to the output signal of the second audio signal should be reduced.

For instance, if the ANC unit 150 is in the NC operating mode, then the ANC-based setting unit 153 may increase the first cutoff frequency $f_{CO1}$, e.g. to $f_{CO1}$=1000 hertz, while the second cutoff frequency $f_{CO2}$ may remain unchanged, e.g. $f_{CO2}$=1500 hertz.

If the ANC unit 150 is in the HT operating mode, then the ANC-based setting unit 153 may set the first cutoff frequency $f_{CO1}$ and the second cutoff frequency $f_{CO2}$ to the same value, e.g. $f_{CO1}$=$f_{CO2}$=1000 hertz, thereby canceling the second audio signal in the output signal.

In the examples provided in reference to FIG. 3, the resulting first crossing frequency $f_{CR1}$ corresponds always to the first cutoff frequency $f_{CO1}$ and the resulting second crossing frequency $f_{CR2}$ corresponds always to the second cutoff frequency $f_{CO2}$.

Figure 4:
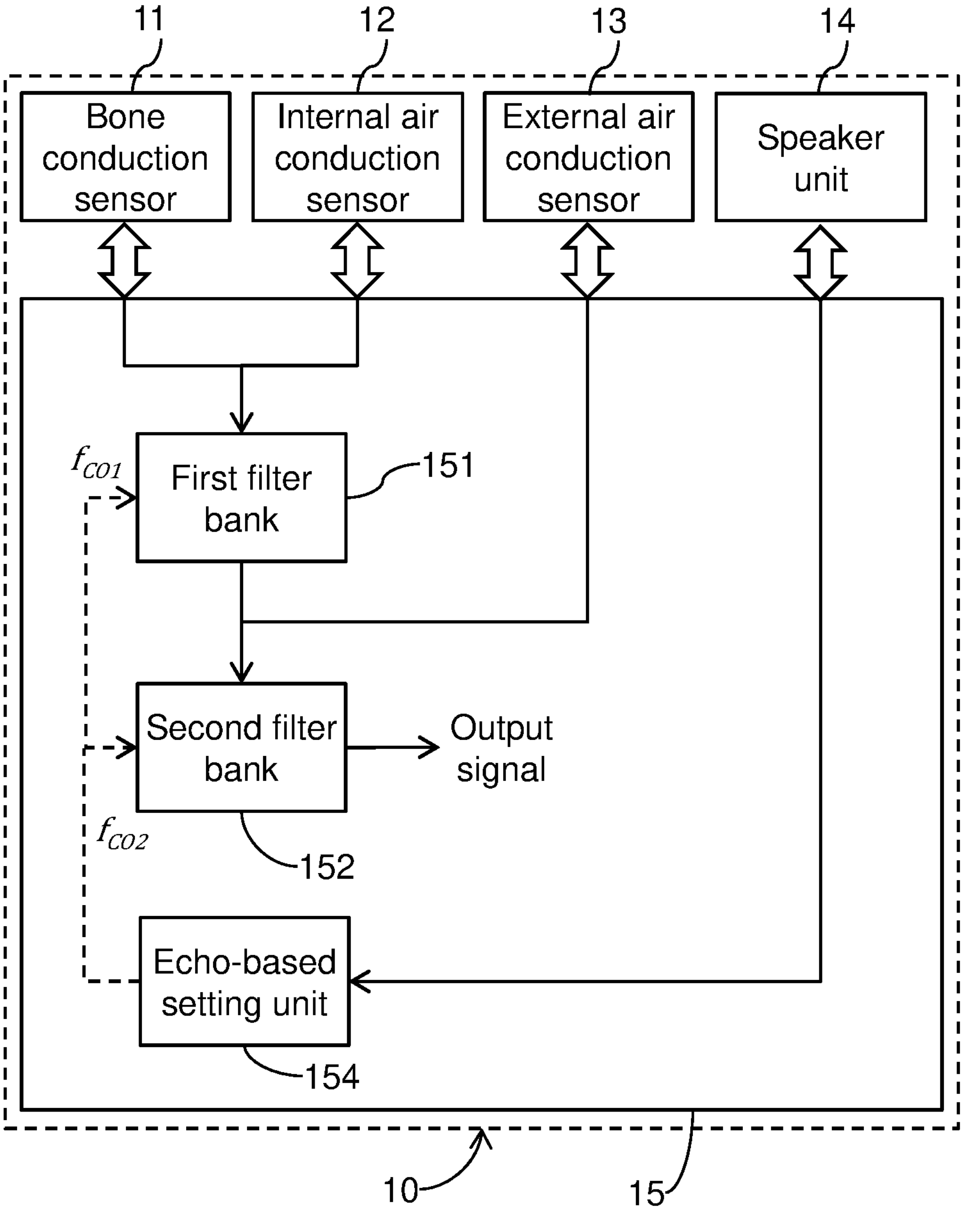
FIG. 4: a schematic representation of a second preferred embodiment of the audio system.

FIG. 4 represents schematically an exemplary embodiment of the audio system 10, in which the first crossing frequency $f_{CR1}$ and the second crossing frequency $f_{CR2}$ are adjusted to the echo level in the second audio signal. In the example illustrated by FIG. 4, the audio system 10 comprises also a first filter bank 151 and a second filter bank 152 which are applied successively, as in FIG. 3. In order to adjust to the echo level in the second audio signal, the audio system 10 comprises an echo-based setting unit 154, implemented by the processing circuit 15, which is configured to estimate the echo level in the second audio signal and to adjust the first cutoff frequency $f_{CO1}$ and/or the second cutoff frequency $f_{CO2}$. In this example, the echo level is estimated based on the (electric) input signal of the speaker unit 14 (which is converted by the speaker unit 14 into an acoustic wave). For instance, the estimated echo level may be representative of the power of said input signal of the speaker unit 14, for instance computed as the root mean square, RMS of said input signal. In such a case, the estimated echo level will generally be higher than the actual echo level in the second audio signal (especially if an AEC unit, if any, is used). However, such an estimated echo level (representative of the power of the input signal of the speaker unit 14) can nonetheless be used since the echo level in the second audio signal increases with the power of the input signal of the speaker unit 14. However, other echo level estimation methods may be used, and the choice of a specific echo level estimation method corresponds to a specific non-limitative embodiment of the present disclosure. For instance, the input signal of the speaker unit 14 may be compared (for instance by correlation) with the second audio signal (possibly after it has been processed by the AEC unit, if any) in order to estimate the actual echo level present in the second audio signal.

As discussed above, the second audio signal should not be used in case of strong echo from the speaker unit 14 and a gap between the second crossing frequency $f_{CR2}$ and the first crossing frequency $f_{CR1}$ should be reduced when the estimated echo level is high compared to when the estimated echo level is low. For instance, the estimated echo level can be compared to a predetermined threshold representative of a strong echo. If the estimated echo level is lower than said threshold, then the echo-based setting unit 154 may set the first cutoff frequency $f_{CO1}$ to a fixed predetermined frequency, for instance $f_{CO1}$=600 hertz. The second cutoff frequency $f_{CO2}$ may also be set to a fixed predetermined frequency, for instance $f_{CO2}$=1500 hertz. If the estimated echo level is greater than said threshold, then the echo-based setting unit 154 may reduce the gap between the first cutoff frequency $f_{CO1}$ and the second cutoff frequency $f_{CO2}$, e.g. by increasing the first cutoff frequency $f_{CO1}$ and/or by decreasing the second cutoff frequency $f_{CO2}$. For instance, the echo-based setting unit 154 may set the first cutoff frequency $f_{CO1}$ and the second cutoff frequency $f_{CO2}$ to the same value, e.g. $f_{CO1}=f_{CO2}$=1000 hertz, thereby canceling the second audio signal in the output signal. In the examples provided in reference to FIG. 4, the resulting first crossing frequency $f_{CR1}$ corresponds always to the first cutoff frequency $f_{CO1}$ and the resulting second crossing frequency $f_{CR2}$ corresponds always to the second cutoff frequency $f_{CO2}$.

Figure 5:
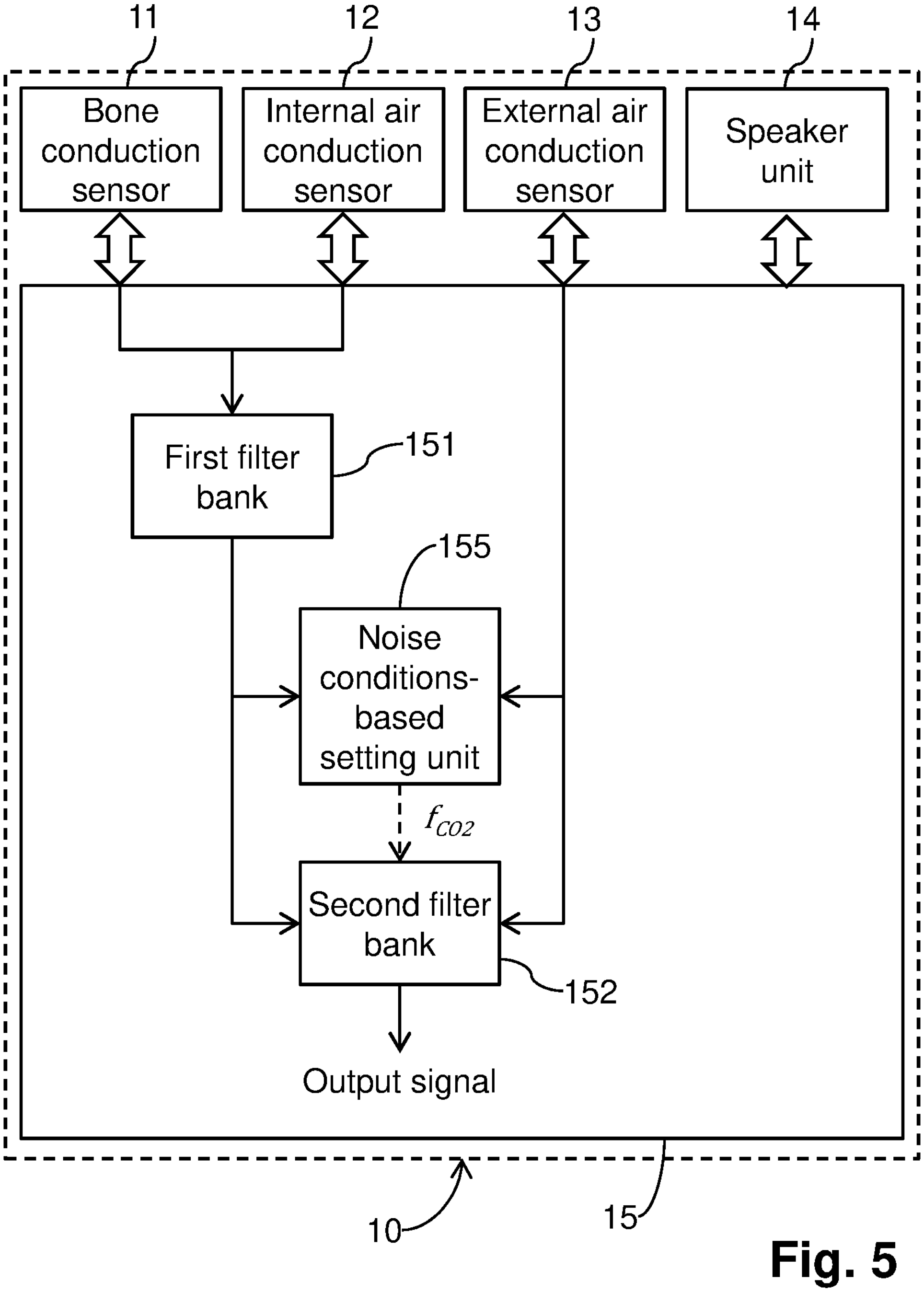
FIG. 5: a schematic representation of a third preferred embodiment of the audio system.

FIG. 5 represents schematically an exemplary embodiment of the audio system 10, in which the first crossing frequency $f_{CR1}$ and the second crossing frequency $f_{CR2}$ are adjusted based on the noise conditions of the audio system 10. In the example illustrated by FIG. 5, the audio system 10 comprises also a first filter bank 151 and a second filter bank 152 which are applied successively, as in FIG. 3. In order to adjust to the noise conditions of the audio system 10, the audio system 10 comprises a noise conditions-based setting unit 155, implemented by the processing circuit 15, which is configured to evaluate the noise conditions and to adjust the first cutoff frequency $f_{CO1}$ and/or the second cutoff frequency $f_{CO2}$.

In the non-limitative example illustrated by FIG. 5, the first cutoff frequency $f_{CO1}$ is set to a predetermined fixed frequency, e.g. $f_{CO1}$=800 hertz. In turn, the second cutoff frequency $f_{CO2}$ is selectively adjusted by the noise conditions-based setting unit 155 based on the evaluated noise conditions and can take any value between a predetermined minimum frequency $f_{min}$ and a predetermined maximum frequency $f_{max}$, i.e. $f_{min} \leq f_{CO2} \leq f_{max}$. The minimum frequency $f_{min}$ and the maximum frequency $f_{max}$ are preferably such that $f_{min} < f_{CO1} < f_{max}$. For instance, $f_{min}$=0 hertz and $f_{max}$=1500 hertz, and the second cutoff frequency $f_{CO2}$ can take any value between 0 hertz and 1500 hertz, depending on the evaluated noise conditions. Hence, in such a case, the second crossing frequency $f_{CR2}$ is identical to the second cutoff frequency $f_{CO2}$, but the first crossing frequency $f_{CR1}$ corresponds to the minimum frequency among the first cutoff frequency $f_{CO1}$ and the second cutoff frequency $f_{CO2}$, i.e. $f_{CR1}=\min(f_{CO1},f_{CO2})$. For instance, when there is no ambient noise and/or when the first audio signal and the second audio signal are affected by a strong noise source that does not affect the third audio signal (e.g. user's teeth tapping, user's finger scratching the earbuds, etc.), then the second cutoff frequency $f_{CO2}$ may be set to $f_{min}$=0 hertz, resulting in $f_{CR1}=f_{CR2}$=0 hertz. Hence, the first audio signal and the second audio signal do not contribute to the output signal. When there is a strong ambient noise and when the first audio signal and the second audio signal are not affected by a strong noise source that does not affect the third audio signal, then the second cutoff frequency $f_{CO2}$ may be set to $f_{max}$=1500 hertz, resulting in $f_{CR1}=f_{CO1}$=800 hertz and $f_{CR2}=f_{max}$=1500 hertz. Hence, all three audio signals contribute to the output signal. Depending on the evaluated noise conditions, the second cutoff frequency $f_{CO2}$ can take any value between $f_{min}$ and $f_{max}$. For instance, in some cases, the second cutoff frequency $f_{CO2}$ may be set to e.g. 600 hertz, in which case $f_{CR1}=f_{CR2}=f_{CO2}$=600 hertz. Hence, the second audio signal does not contribute to the output signal.

More generally, the second crossing frequency $f_{CR2}$ should be increased when a level of a first noise affecting the third audio signal is increased, on a predetermined frequency band (e.g. $[f_{min},f_{max}]$) with respect to a level of a second noise affecting, on the same frequency band, the first audio signal or the second audio signal or a combination thereof. For instance, the second crossing frequency $f_{CR2}$ is set to higher value when the first noise level is higher than the second noise level compared to when the first noise level is lower than the second noise level.

Hence, the noise conditions-based setting unit 155 needs to evaluate the noise conditions of the audio system 10. In general, any noise conditions evaluation method known to the skilled person may be used, and the choice of a specific noise conditions evaluation method corresponds to a specific non-limitative embodiment of the present disclosure. It should be noted that the noise conditions evaluation method does not necessarily require to estimate directly e.g. the first noise level and/or the second noise level. In other words, evaluating the noise conditions does not necessarily require estimating actual noise levels in the different audio signals. It is sufficient, for instance, for the noise conditions-based setting unit 155 to obtain an information on which one is the greatest among the first noise level and the second noise level. Accordingly, in the present disclosure, evaluating the noise conditions only requires obtaining an information representative of whether or not the third audio signal is likely to be more affected by noise than the first and/or second audio signal.

For instance, evaluating the noise conditions may be performed by estimating only the first noise level and determining the second crossing frequency $f_{CR2}$ based only on the estimated first noise level. For instance, the second crossing frequency $f_{CR2}$ may be proportional to the estimated first noise level, or the second crossing frequency $f_{CR2}$ may be selected among different possible values by comparing the estimated first noise level to one or more predetermined thresholds, etc.

According to another example, evaluating the noise conditions may be performed by comparing audio spectra of the third audio signal and of the first and/or second audio signals. For instance, the setting of the second cutoff frequency $f_{CO2}$ by the noise conditions-based setting unit 155 may use the method described in U.S. patent application Ser. No. 17/667,041, filed on Feb. 8, 2022, the contents of which are hereby incorporated by reference in its entirety.

In preferred embodiments, determining the second cutoff frequency $f_{CO2}$ by the noise conditions-based setting unit 155 comprises:

- processing the intermediate audio signal to produce an intermediate audio spectrum on a predetermined frequency band,
- processing the third audio signal to produce a third audio spectrum on said frequency band,
- computing an intermediate cumulated audio spectrum by cumulating intermediate audio spectrum values, computing a third cumulated audio spectrum by cumulating third audio spectrum values,
- determining the second cutoff frequency $f_{CO2}$ by comparing the intermediate cumulated audio spectrum and the third cumulated audio spectrum.

The intermediate audio spectrum and the third audio spectrum may be computed by using any time to frequency conversion method, for instance an FFT or a discrete Fourier transform, DFT, a DCT, a wavelet transform, etc. In other examples, the computation of the intermediate audio spectrum and the third audio spectrum may for instance use a bank of bandpass filters which filter the intermediate and third audio signals in respective frequency sub-bands of the frequency band, etc.

In the sequel, we assume in a non-limitative manner that the frequency band on which the intermediate audio spectrum and the third audio spectrum are computed is the frequency band $[f_{min}, f_{max}]$, and is composed of N discrete frequency values $f_n$ with $1 \leq n \leq N$, wherein $f_{min}=f_1$ and $f_{max}=f_N$, and $f_{n-1}<f_n$ for any $2 \leq n \leq N$. Hence, the intermediate audio spectrum $S_I$ corresponds to a set of values $\{S_I(f_n), 1 \leq n \leq N\}$ wherein $S_I(f_n)$ is representative of the power of the intermediate audio signal at the frequency $f_n$. For instance, if the intermediate audio spectrum is computed by an FFT of an intermediate audio signal $s_I$, then $S_I(f_n)$ can correspond to $|FFT[s_I](f_n)|$ (i.e. modulus or absolute level of $FFT[s_I](f_n)$), or to $|FFT[s_I](f_n)|^2$ (i.e. power of $FFT[s_I](f_n)$), etc. Similarly, the third audio spectrum $S_3$ corresponds to a set of values $\{S_3(f_n), 1 \leq n \leq N\}$ wherein $S_3(f_n)$ is representative of the power of the third audio signal at the frequency $f_n$. More generally, each intermediate (resp. third) audio spectrum value is representative of the power of the intermediate (resp. third) audio signal at a given frequency in the considered frequency band or within a given frequency sub-band in the considered frequency band.

The intermediate cumulated audio spectrum is designated by $S_{IC}$ and is determined by cumulating intermediate audio spectrum values. Hence, each intermediate cumulated audio spectrum value is determined by cumulating a plurality of intermediate audio spectrum values (except maybe for frequencies at the boundaries of the considered frequency band).

For instance, the intermediate cumulated audio spectrum $S_{IC}$ is determined by progressively cumulating all the intermediate audio spectrum values from $f_{min}$ to $f_{max}$, i.e.:

$$S_{IC}(f_n)=\Sigma_{i=1}^{n} S_I(f_i) \quad (1)$$

In some embodiments, the intermediate audio spectrum values may be cumulated by using weighting factors, for instance a forgetting factor $0<\lambda<1$:

$$S_{IC}(f_n)=\Sigma_{i=1}^{n} \lambda^{n-i} S_I(f_i) \quad (2)$$

Alternatively, or in combination thereof, the intermediate audio spectrum values may be cumulated by using a sliding window of predetermined size K<N:

$$S_{IC}(f_n)=\Sigma_{i=max(1,n-K)}^{n} S_I(f_i) \quad (3)$$

Similarly, the third cumulated audio spectrum is designated by $S_{3C}$ and is determined by cumulating third audio spectrum values. Hence, each third cumulated audio spectrum value is determined by cumulating a plurality of third audio spectrum values (except maybe for frequencies at the boundaries of the considered frequency band).

As discussed above for the intermediate cumulated audio spectrum, the third cumulated audio spectrum may be determined by progressively cumulating all the third audio spectrum values, for instance from $f_{min}$ to $f_{max}$:

$$S_{3C}(f_n)=\Sigma_{i=1}^{n} S_3(f_i) \quad (4)$$

Similarly, it is possible, when cumulating third audio spectrum values, to use weighting factors and/or a sliding window:

$$S_{3C}(f_n)=\Sigma_{i=1}^{n} \lambda^{n-i} S_3(f_i) \quad (5)$$

$$S_{3C}(f_n)=\Sigma_{i=max(1,n-K)}^{n} S_3(f_i) \quad (6)$$

Also, it is possible to cumulate intermediate (resp. third) audio spectrum values from the maximum frequency to the minimum frequency, which yields, when all intermediate (resp. third) audio spectrum values are cumulated:

$$S_{IC}(f_n)=\Sigma_{i=n}^{N} S_I(f_i) \quad (7)$$

$$S_{3C}(f_n)=\Sigma_{i-n}^{N} S_3(f_i) \quad (8)$$

Similarly, it is possible to use weighting factors and/or a sliding window when cumulating intermediate (resp. third) audio spectrum values.

In some embodiments, it is possible to cumulate the intermediate audio spectrum values in a different direction than the direction used for cumulating the third audio spectrum values, wherein a direction corresponds to either increasing frequencies in the frequency band (i.e. from $f_{min}$ to $f_{max}$) or decreasing frequencies in the frequency band (i.e. from $f_{max}$ to $f_{min}$). For instance, it is possible to consider the intermediate cumulated audio spectrum given by equation (1) and the third cumulated audio spectrum given by equation (8):

$$S_{IC}(f_n)=\Sigma_{i=1}^{n} S_I(f_i)$$

$$S_{3C}(f_n)=\Sigma_{i=n}^{N} S_3(f_i)$$

In such a case (different directions used), it is also possible, if desired, to use weighting factors and/or sliding windows when computing the intermediate cumulated audio spectrum and/or the third cumulated audio spectrum.

Then the second cutoff frequency $f_{CO2}$ is determined by comparing the intermediate cumulated audio spectrum $S_{IC}$ and the third cumulated audio spectrum $S_{3C}$. Generally speaking, the presence of noise in frequencies of one among the intermediate (resp. third) audio spectrum will locally increase the power for those frequencies of the intermediate (resp. third) audio spectrum.

The determination of the second cutoff frequency $f_{CO2}$ depends on how the intermediate and third cumulated audio spectra are computed.

For instance, when both the intermediate and third audio spectra are cumulated from $f_{min}$ to $f_{max}$ (with or without weighting factors and/or sliding window), the second cutoff frequency $f_{CO2}$ may be determined by comparing directly the intermediate and third cumulated audio spectra. In such a case, the second cutoff frequency $f_{CO2}$ can for instance be determined based on the highest frequency in $[f_{min}, f_{max}]$ for which the intermediate cumulated audio spectrum $S_{IC}$ is below the third cumulated audio spectrum $S_{3C}$. Hence, if $S_{IC}(f_n) \geq S_{3C}(f_n)$ for any $n>n'$, with $1 \leq n' \leq N$, and $S_{IC}(f_{n'})<S_{3C}(f_{n'})$, the second cutoff frequency $f_{CO2}$ may be determined based on the frequency $f_{n'}$, for instance $f_{CO2}=f_{n'}$ or $f_{CO2}=f_{n'-1}$. Accordingly, if the intermediate cumulated audio spectrum is greater than the third cumulated audio spectrum for any frequency $f_n$ in $[f_{min}, f_{max}]$, then the second cutoff frequency $f_{CO2}$ corresponds to $f_{min}$.

According to another example, when the intermediate and third audio spectra are cumulated using different directions (with or without weighting factors and/or sliding window), the second cutoff frequency $f_{CO2}$ may be determined by comparing indirectly the intermediate and third cumulated audio spectra. For instance, this indirect comparison may be performed by computing a sum $S_\Sigma$ of the intermediate and third cumulated audio spectra, for example as follows:

$$S_{93}(f_n)=S_{IC}(f_n)+S_{3C}(f_{n+1})$$

Assuming that the intermediate cumulated audio spectrum is given by equation (1) and that the third cumulated audio spectrum is given by equation (8):

$$S_\Sigma(f_n)=\Sigma_{i=1}^{n} S_I(f_i)+\Sigma_{i=n+1}^{N} S_3(f_i) \quad (9)$$

Hence, the sum $S_\Sigma(f_n)$ can be considered to be representative of the total power on the frequency band $[f_{min}, f_{max}]$ of an output signal obtained by mixing the intermediate audio signal and the third audio signal by using the second cutoff frequency $f_n$. In principle, minimizing the sum $S_\Sigma(f_n)$ corresponds to minimizing the noise level in the output signal. Hence, the second cutoff frequency $f_{CO2}$ may be determined based on the frequency for which the sum $S_\Sigma(f_n)$ is minimized. For instance, if:

$$f_{n'} = \arg\left(\min_{f_1 \cdots f_N}(S_\Sigma(f_n))\right) \quad (10)$$

then the second cutoff frequency $f_{CO2}$ may be determined as $f_{CO2}=f_{n'}$ or $f_{CO2}=f_{n'-1}$.

More generally speaking, determining the second cutoff frequency $f_{CO2}$ comprises preferably searching for an optimum frequency $f_{n'}$ minimizing a total power, on the considered frequency band, of a combination based on the optimum frequency $f_{n'}$ of the intermediate audio signal with the third audio signal, wherein the second cutoff frequency $f_{CO2}$ is determined based on the optimum frequency $f_{n'}$. This optimization of the total power can also be carried out without computing the intermediate and third cumulated audio spectra.

As discussed above, the embodiments in FIGS. 3, 4 and 5 may also be combined.

For instance, the embodiment in FIG. 5 can be combined with the embodiment in FIG. 3. For instance, compared to what has been described in reference to FIG. 3, the second cutoff frequency $f_{CO2}$ is controlled based on the ANC operating mode by adjusting the maximum frequency $f_{max}$, and then the second cutoff frequency $f_{CO2}$ may be adjusted as described in reference to FIG. 5 by selecting a frequency in $[f_{min}, f_{max}]$. For instance, if the ANC unit 150 is disabled (OFF operating mode), then the maximum frequency $f_{max}$ may be set to a fixed predetermined frequency, for instance $f_{max}$=1500 hertz. If the ANC unit 150 is in the NC operating mode, then the maximum frequency $f_{max}$ may remain unchanged, e.g. $f_{max}$=1500 hertz. If the ANC unit 150 is in the HT operating mode, then the maximum frequency $f_{max}$ may be reduced and set to a fixed predetermined frequency, e.g. $f_{max}$=1000 hertz.

Similarly, the embodiment in FIG. 5 can be combined with the embodiment in FIG. 4. For instance, compared to what has been described in reference to FIG. 4, the second cutoff frequency $f_{CO2}$ is controlled based on the estimated echo level by adjusting the maximum frequency $f_{max}$, and then the second cutoff frequency $f_{CO2}$ may be adjusted as described in reference to FIG. 5 by selecting a frequency in $[f_{min}, f_{max}]$.

Figure 6:
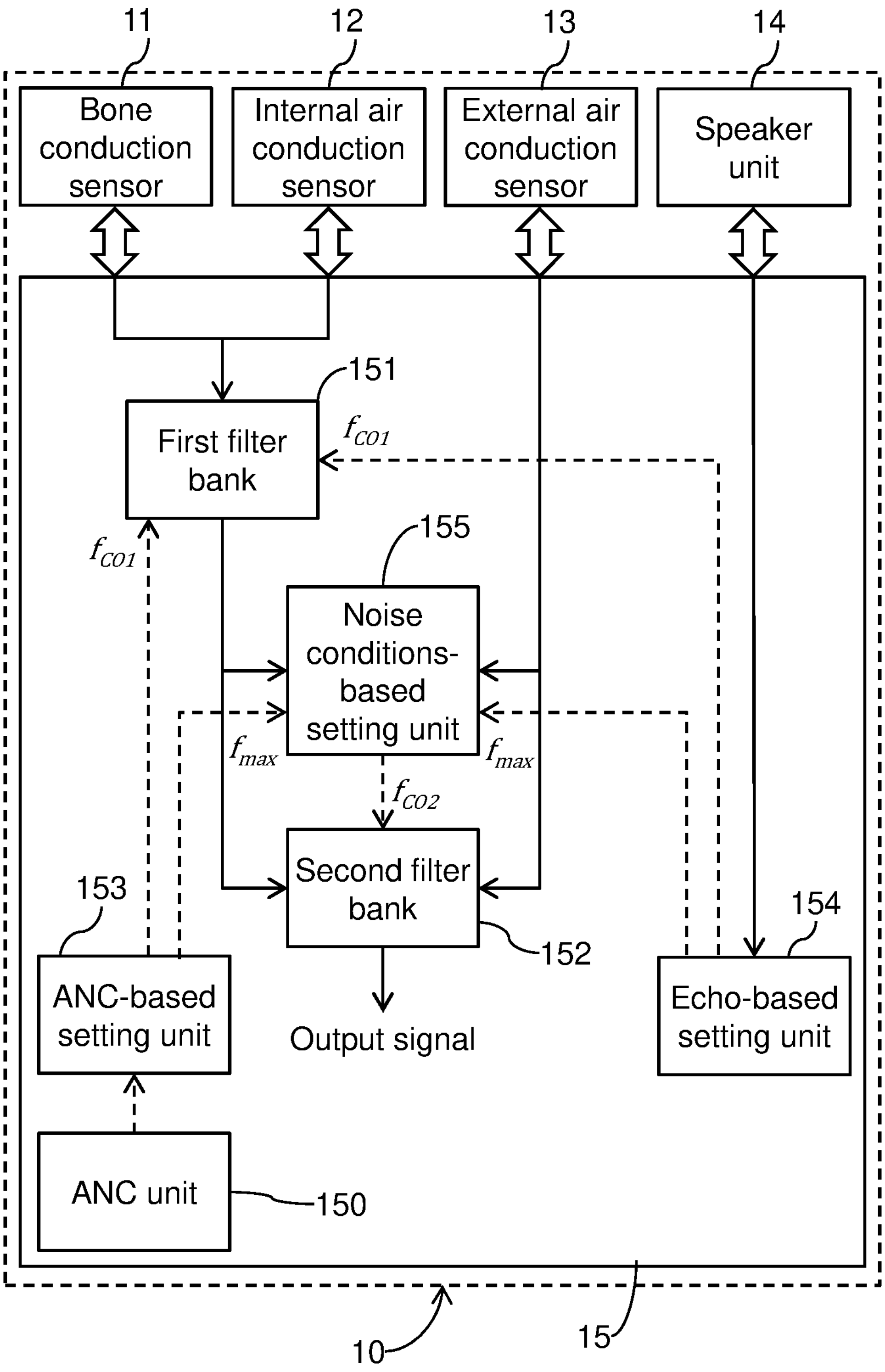
FIG. 6: a schematic representation of a fourth preferred embodiment of the audio system.

FIG. 6 represents schematically a preferred embodiment combining all the embodiments in FIGS. 3 to 5. In this non-limitative example, the ANC-based setting unit 153 and the echo-based setting unit 154 can adjust the first cutoff frequency $f_{CO1}$ (wherein the first filter bank 151 preferably applies the highest first cutoff frequency received) and the maximum frequency $f_{max}$ to be considered by the noise conditions-based setting unit 155 (which preferably applies the lowest maximum frequency received) to adjust the second cutoff frequency $f_{CO2}$ of the second filter bank 152.

In FIGS. 3 to 6, the filter banks are updated based on their respective cutoff frequencies, i.e. the filter coefficients are updated to account for any change in the determined cutoff frequencies (with respect to previous frames of the first, second and third audio signals). The filter banks are typically implemented using analysis-synthesis filter banks or using time-domain filters such as finite impulse response, FIR, or infinite impulse response, IIR, filters. For example, a time-domain implementation of a filter bank may correspond to textbook Linkwitz-Riley crossover filters, e.g. of 4th order. A frequency-domain implementation of the filter bank may include applying a time to frequency conversion on the input audio signals and applying frequency weights which correspond respectively to a low-pass filter and to a high-pass filter. Then both weighted audio spectra are added together into an output spectrum that is converted back to the time-domain to produce the intermediate audio signal and the output signal, by using e.g. an inverse fast Fourier transform, IFFT.

It is emphasized that the present disclosure is not limited to the above exemplary embodiments. Variants of the above exemplary embodiments are also within the scope of the present invention.

For instance, the present disclosure has been provided by considering mainly a first filter bank 151 applied to the first audio signal and the second audio signal to produce an intermediate audio signal, and a second filter bank 152 applied to the intermediate audio signal and to the third audio signal to produce the output signal. Of course, it is also possible, in other embodiments of the present disclosure, to swap the order of the filter banks. For instance, a filter bank can be similarly first applied to the second and third audio signals to produce an intermediate audio signal and another filter bank can be applied similarly to the first audio signal and to the intermediate audio signal. It is also possible, in other embodiments of the present disclosure, to use a single filter bank which combines simultaneously all three audio signals based on predetermined first and second crossing frequencies $f_{CR1}$ and $f_{CR2}$, etc.

Also, the first and second crossing (resp. cutoff) frequencies may be directly applied, or they can optionally be smoothed over time using an averaging function, e.g. an exponential averaging with a configurable time constant.

Also, while the present disclosure has been provided by considering mainly a hybrid type of ANC unit 150, i.e. an ANC unit 150 using both a feedforward sensor (the external air conduction sensor 13) and feedback sensor (internal air conduction sensor 12), it can be applied similarly to any type of ANC unit 150.

The invention claimed is:

1. An audio signal processing method comprising measuring a voice signal emitted by a user, wherein said measuring of the voice signal is performed by an audio system comprising at least three sensors which include a first sensor, a second sensor and a third sensor, wherein the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head, wherein measuring the voice signal produces a first audio signal by the first sensor, a second audio signal by the second sensor, and a third audio signal by the third sensor, wherein the audio signal processing method further comprises producing an output signal by using the first audio signal, the second audio signal and the third audio signal, wherein the output signal corresponds to: the first audio signal below a first crossing frequency, the second audio signal between the first crossing frequency and a second crossing frequency, the third audio signal above the second crossing frequency, wherein the first crossing frequency is lower than or equal to the second crossing frequency, wherein the first crossing frequency and the second crossing frequency are different for at least some operating conditions of the audio system.

2. The audio signal processing method according to claim 1, further comprising adapting the first crossing frequency and/or the second crossing frequency based on the operating conditions of the audio system.

3. The audio signal processing method according to claim 2, wherein the operating conditions are defined by at least one among:

an operating mode of an active noise cancellation unit of the audio system, noise conditions of the audio system, a level of an echo signal in the second audio signal caused by a speaker unit of the audio system, referred to as echo level.

4. The audio signal processing method according to claim 3, further comprising reducing a gap between the second crossing frequency and the first crossing frequency when the active noise cancellation unit is enabled compared to when the active noise cancellation unit is disabled.

5. The audio signal processing method according to claim 4, further comprising:

estimating the echo level, reducing a gap between the second crossing frequency and the first crossing frequency when the estimated echo level is high compared to when the estimated echo level is low.

6. The audio signal processing method according to claim 3, further comprising:

estimating the echo level, reducing a gap between the second crossing frequency and the first crossing frequency when the estimated echo level is high compared to when the estimated echo level is low.

7. The audio signal processing method according to claim 3, further comprising reducing the second crossing frequency when a level of a first noise affecting the third audio signal is decreased with respect to a level of a second noise affecting the first audio signal or the second audio signal or a combination thereof.

8. The audio signal processing method according to claim 1, further comprising:

combining the first audio signal with the second audio signal based on a first cutoff frequency, thereby producing an intermediate audio signal, determining the second crossing frequency based on the intermediate audio signal and based on the third signal, combining the intermediate audio signal with the third audio signal based on the second crossing frequency, wherein the first crossing frequency corresponds to a minimum frequency among the first cutoff frequency and the second crossing frequency.

9. The audio signal processing method according to claim 8, wherein determining the second crossing frequency comprises:

processing the intermediate audio signal to produce an intermediate audio spectrum on a frequency band, processing the third audio signal to produce a third audio spectrum on the frequency band, computing an intermediate cumulated audio spectrum by cumulating intermediate audio spectrum values, computing a third cumulated audio spectrum by cumulating third audio spectrum values, determining the second crossing frequency by comparing the intermediate cumulated audio spectrum and the third cumulated audio spectrum.

10. The audio signal processing method according to claim 8, wherein determining the second crossing frequency comprises searching for an optimum frequency minimizing a power of a combination, based on the optimum frequency, of the intermediate audio signal with the third audio signal, wherein the second crossing frequency is determined based on the optimum frequency.

11. An audio system comprising at least three sensors which include a first sensor, a second sensor and a third sensor, wherein the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head, wherein the first sensor is configured to produce a first audio signal by measuring a voice signal emitted by the user, the second sensor is configured to produce a second audio signal by measuring the voice signal and the third sensor is arranged to produce a third audio signal by measuring the voice signal, wherein said audio system further comprises a processing circuit configured to produce an output signal by using the first audio signal, the second audio signal and the third audio signal, wherein the output signal corresponds to:

the first audio signal below a first crossing frequency, the second audio signal between the first crossing frequency and a second crossing frequency, the third audio signal above the second crossing frequency, wherein the first crossing frequency is lower than or equal to the second crossing frequency, wherein the first crossing frequency and the second crossing frequency are different for at least some operating conditions of the audio system.

12. The audio system according to claim 11, wherein the processing circuit is further configured to adapt the first crossing frequency and/or the second crossing frequency based on the operating conditions of the audio system.

13. The audio system according to claim 12, wherein the operating conditions are defined by at least one among:

an operating mode of an active noise cancellation unit of the audio system, noise conditions of the audio system, a level of an echo signal in the second audio signal caused by a speaker unit of the audio system, referred to as echo level.

14. The audio system according to claim 13, wherein the processing circuit is further configured to reduce a gap between the second crossing frequency and the first crossing frequency when the active noise cancellation unit is enabled compared to when the active noise cancellation unit is disabled.

15. The audio system according to claim 13, wherein the processing circuit is further configured to:

estimate the echo level, reduce a gap between the second crossing frequency and the first crossing frequency when the estimated echo level is high compared to when the estimated echo level is low.

16. The audio system according to claim 13, wherein the processing circuit is further configured to reduce the second crossing frequency when a level of a first noise affecting the third audio signal is decreased with respect to a level of a second noise affecting the first audio signal or the second audio signal or a combination thereof.

17. The audio system according to claim 11, wherein the processing circuit is further configured to:

combine the first audio signal with the second audio signal based on a first cutoff frequency, thereby producing an intermediate audio signal, determine the second crossing frequency based on the intermediate audio signal and based on the third signal, combine the intermediate audio signal with the third audio signal based on the second crossing frequency, wherein the first crossing frequency corresponds to a minimum frequency among the first cutoff frequency and the second crossing frequency.

18. The audio system according to claim 17, wherein the processing circuit is configured to determine the second crossing frequency by:

processing the intermediate audio signal to produce an intermediate audio spectrum on a frequency band, processing the third audio signal to produce a third audio spectrum on the frequency band, computing an intermediate cumulated audio spectrum by cumulating intermediate audio spectrum values, computing a third cumulated audio spectrum by cumulating third audio spectrum values, determining the second crossing frequency by comparing the intermediate cumulated audio spectrum and the third cumulated audio spectrum.

19. The audio signal processing method according to claim 17, wherein the processing circuit is configured to determine the second crossing frequency by searching for an optimum frequency minimizing a power of a combination, based on the optimum frequency, of the intermediate audio signal with the third audio signal, wherein the second crossing frequency is determined based on the optimum frequency.

20. A non-transitory computer readable medium comprising computer readable code to be executed by an audio system comprising at least three sensors which include a first sensor, a second sensor and a third sensor, wherein the first sensor is a bone conduction sensor, the second sensor is an air conduction sensor, the first sensor and the second sensor being arranged to measure voice signals which propagate internally to the user's head, and the third sensor is an air conduction sensor arranged to measure voice signals which propagate externally to the user's head, wherein the audio system further comprises a processing circuit, wherein said computer readable code causes said audio system to:

produce, by the first sensor, a first audio signal by measuring a voice signal emitted by the user, produce, by the second sensor, a second audio signal by measuring the voice signal emitted by the user, produce, by the third sensor, a third audio signal by measuring the voice signal emitted by the user, produce, by the processing circuit, an output signal by using the first audio signal, the second audio signal and the third audio signal, wherein the output signal corresponds to:

the first audio signal below a first crossing frequency, the second audio signal between the first crossing frequency and a second crossing frequency, the third audio signal above the second crossing frequency, wherein the first crossing frequency is lower than or equal to the second crossing frequency, wherein the first crossing frequency and the second crossing frequency are different for at least some operating conditions of the audio system.

* * * * *